United States Patent [19]

Doi et al.

[11] Patent Number: 4,975,223
[45] Date of Patent: Dec. 4, 1990

[54] OPTICAL MATERIAL

[75] Inventors: Hideaki Doi, Matsudo; Teruo Sakagami, Tokyo, both of Japan

[73] Assignee: Kureha Kagaku Kogyo Kabushiki Kaisha, Japan

[21] Appl. No.: 305,647

[22] Filed: Feb. 3, 1989

[30] Foreign Application Priority Data

Mar. 23, 1988 [JP] Japan ................................. 63-67218

[51] Int. Cl.$^5$ ............................ F21V 9/04; C08F 12/02
[52] U.S. Cl. ................................... 252/589; 252/587; 526/346; 526/347; 526/347.1; 526/329.7; 526/329.2; 526/329.4; 526/337; 526/340
[58] Field of Search ............... 526/346, 347, 347.1, 526/329.7, 329.2, 329.4, 337, 340; 252/589

[56] References Cited

U.S. PATENT DOCUMENTS

| | | | |
|---|---|---|---|
| 3,882,084 | 5/1975 | Tato et al. | 526/220 |
| 4,075,237 | 2/1978 | Kleiner et al. | 260/455 R |
| 4,888,401 | 12/1989 | Kawaki et al. | 525/468 |

FOREIGN PATENT DOCUMENTS

| | | |
|---|---|---|
| 60-092313 | 5/1985 | Japan . |
| 61-167901 | 7/1986 | Japan . |
| 2112002 | 7/1983 | United Kingdom . |

OTHER PUBLICATIONS

Holdaway I. et al, Makromol, Chem., 179(8) 1939–1950 1978.
Baroni E. E., et al, Zh. Org. Khim. 7(11), 2395–2398, 1971.
Die Makromolekulare Chemie 62, p. 31–39, Jan. 1963.

*Primary Examiner*—John S. Maples
*Assistant Examiner*—Richard Treanor
*Attorney, Agent, or Firm*—Arnold, White & Durkee

[57] ABSTRACT

An optical material of a high refractive index is formed of a copolymer obtained by copolymerizing 3–40 wt. % of 4-isopropenylbiphenyl, 30–97 wt. % of a monofunctional aromatic monomer represented by the following formula (I) or (II) and 0–67 wt. % of another monomer copolymerizable with 4-isopropenylbiphenyl and the monofunctional aromatic monomer.

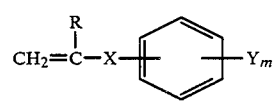

Formula (I)

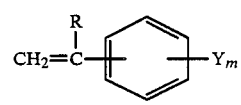

Formula (II)

wherein R means a hydrogen atom or methyl group, X denotes

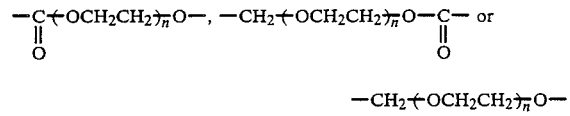

$$-CH_2+OCH_2CH_2\overline{)_n}O-$$

in which n stands for an integer of 0–3, Y is a halogen atom other than a fluorine atom, or a methyl, hydroxyl or methoxy group, and m stands for an integer of 0–3, with the proviso that Y may be different from each other when m is 2 or 3.

4 Claims, No Drawings

OPTICAL MATERIAL

BACKGROUND OF THE INVENTION

(1) Field of the Invention

This invention relates to an optical material, and specifically to an optical material formed of a copolymer containing 4-isopropenylbiphenyl and a particular monofunctional aromatic monomer as essential components and having a high refractive index.

(2) Description of the Related Art

Inorganic glass is now used widely as an optical material for lenses, prisms and the like. Since the inorganic glass employed as an optical material has a specific gravity as high as 2.4–6.2, the optical material has a heavy weight, thereby encountering a problem upon incorporation into optical systems such as office automation equipment for which size and weight reduction is essential. With a view toward solving the problem, a great deal of work has been carried out for the development of optical materials having a lower specific gravity compared to inorganic glass in general and formed of a polymer or copolymer. Some optical materials of the above-mentioned sort have already found actual utility, for example, as spectacle lenses.

A variety of characteristics are required for such optical materials. Among these, high refractive index, low specific gravity, colorlessness and excellent transparency can be mentioned fundamentally as important characteristics. When an optical material to be used as a spectacle lens has a high refractive index and a low specific gravity, the peripheral thickness of the lens can be reduced substantially, so that the lens can be provided as a thin lens as a whole. A weight reduction is therefore feasible from this point too. Such an optical material is thus extremely preferred.

However, in case of obtaining a lens from an optical material having a low specific gravity and a low refractive index, it is necessary to reduce the radius of the lens in order to provide a necessary refracting power. As a result, both the thickness and the volume of the lens are increased. Although the weight reduction was sought for, this objective cannot be achieved fully as a consequence. When an optical material is itself colored or has inferior transparency, use of a lens or the like made of such optical material in an optical system tends to result in a problem such that the transmission spectrum is distorted or the transmittance of light of a desired wavelength is lowered. A limitation is therefore imposed on its application field. Such an optical lens is hence not desired.

As optical materials having a low specific gravity, polymethyl methacrylate (specific gravity, d: 1.19, refractive index $n_d$: 1.49), polydiethylene glycol bisallylcarbonate (d: 1.32, $n_d$: 1.50), polycarbonate (d: 1.20, $n_d$: 1.58), polystyrene (d: 1.06, $n_d$: 1.59) are known widely these days. None of these optical materials however have any sufficiently high refractive index.

On the other hand, a variety of proposals has been made on optical materials having a high refractive index. For example, Japanese Patent Publication No. 14449/1983 discloses dimethacrylate or diacrylate copolymers in which each nucleus halogen-substituted aromatic ring is coupled to a methacryloyloxy or acryloyloxy group through an alkylene glycol group. Further, Japanese Patent Laid-Open No. 51706/1985 discloses polymers of a urethanated (meth)acrylic monomer formed by reacting a bromine-substituted aromatic monomer having one or more hydroxyl groups with a polyfunctional isocyanate.

In order to obtain an optical material having sufficiently high refractive index in accordance with these techniques, it is however indispensable to increase the proportion of the halogen atoms contained. This has lead to a problem that the specific gravity of the optical material becomes high. For example, optical materials of this sort whose refractive indexes $n_d$ are as high as at least 1.60 have a specific gravity d as high as 1.4–2.2 without exception.

Some proposals have also been made regarding optical materials having a high refractive index and a low specific gravity. None of these proposals are however fully satisfactory. Namely, they are accompanied by one or more problems such that they are colored or they are susceptible to coloration or transparency reduction due to their low chemical stability and their production is not easy due to poor solubility of raw materials. There is another problem that the wavelength dependency (dispersion characteristics) of their refractive indexes is great and a limitation is hence imposed on their application as optical materials.

SUMMARY OF THE INVENTION

As a result of an extensive investigation with a view toward solving such problems as mentioned above, it has been found that a colorless optical material having a high refractive index, a small specific gravity and excellent transparency can be obtained from a copolymer containing 4-isopropenylbiphenyl and a particular monofunctional aromatic monomer as essential components. The present invention has been completed on the basis of the above finding.

In an aspect of this invention, there is provided an optical material comprising a copolymer obtained by copolymerizing 3–40 wt. % of 4-isopropenylbiphenyl, 30–97 wt. % of a monofunctional aromatic monomer represented by the following formula (I) or (II) and 0–67 wt. % of another monomer copolymerizable with 4-isopropenylbiphenyl and the monofunctional aromatic monomer.

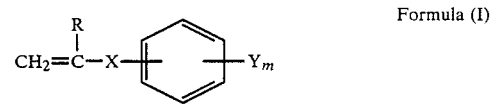

Formula (I)

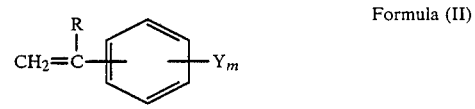

Formula (II)

wherein R means a hydrogen atom or methyl group, X denotes

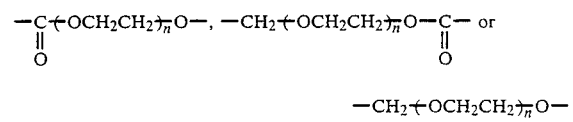

in which n stands for an integer of 0–3, Y is a halogen atom other than a fluorine atom, or a methyl, hydroxyl or methoxy group, and m stands for an integer of 0–3, with the proviso that Y may be different from each other when m is 2 or 3.

The optical material according to this invention has a high refractive index in spite of its low specific gravity, is colorless and enjoys excellent transparency, and besides, its production is easy because it is formed of the copolymer containing, as essential components, 4-isopropenylbiphenyl and the particular monofunctional aromatic monomer (hereinafter referred to as "monomer (A)") represented by the formula (I) or (II).

DETAILED DESCRIPTION OF THE INVENTION AND PREFERRED EMBODIMENTS

The copolymer according to this invention contain 4-isopropenylbiphenyl as an essential component. Therefore, the polymerization product to be formed is scarcely colored in the course of its polymerization. In addition, few cracks occur thereon owing to the small shrinkage strain upon the polymerization. It is hence possible to produce easily a copolymer having a high refractive index and a low specific gravity, which is useful as an optical material.

4-Isopropenylbiphenyl, which is one of the essential components of the copolymer according to this invention, has a melting point as high as about 122° C. It is thus necessary to use a process temperature as high as at least 122° C. in order to obtain an optical material by conducting bulk polymerization of 4-isopropenylbiphenyl alone, so that workability is extremely lowered. Further, when 4-isopropenylbiphenyl is singly subjected to bulk polymerization, the shrinkage strain upon the polymerization becomes greater so that the polymerization product to be formed tends to be cracked. The resultant polymer is hence unsuited for an optical material.

When employing a monomer (A) as a comonomer copolymerizable with 4-isopropenylbiphenyl, it is possible to obtain advantages that the shrinkage strain upon their copolymerization is small, whereby few cracks occur on the resultant polymerization product, and that the process temperature can be lowered.

For the above reason, the monomer (A) represented by the following formula (1) or (II) is used as an essential component in combination with 4-isopropenylbiphenyl.

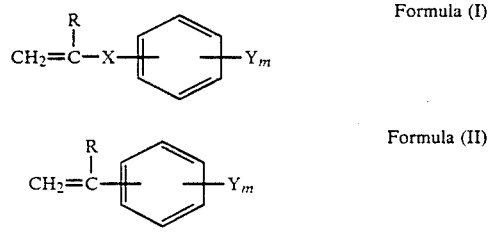

Formula (I)

Formula (II)

wherein R means a hydrogen atom or methyl group, X denotes

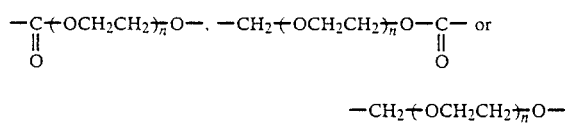

in which n stands for an integer of 0-3, Y is a halogen atom other than a fluorine atom, or a methyl, hydroxyl or methoxy group, and m stands for an integer of 0-3, with the proviso that Y may be different from each other when m is 2 or 3.

As specific examples of the monomer (A) represented by the above formula (I), the following monomers may be mentioned.

(i) Aromatic (meth)acrylates:

For example, phenyl acrylate, phenyl methacrylate, (meth)acryloxyethoxybenzene, (meth)acryloxydiethoxybenzene, (meth)acryloxytriethoxybenzene, bromophenyl acrylate, bromophenyl methacrylate, dibromophenyl acrylate, tribromophenyl methacrylate, (meth)acryloxyethoxy-2,4,6-tribromobenzene, (meth)acryloxydiethoxytrichlorobenzene, p-hydroxyphenyl methacrylate, etc. The term "(meth)acryloxy" as used herein means groups or structures derived from both acrylic acid and methacrylic acid.

(2) Aromatic allyl esters:

For example, allyl benzoate, allyl dibromobenzoate, allyl iodebenzoate, etc.

(3) Aromatic allyl ethers:

For example, allyl phenyl ether, allyl iodephenyl ether, etc.

As specific examples of the monomer (A) represented by the above formula (II), the following monomers may be mentioned.

(4) Aromatic vinyl compounds:

For example, styrene, α-methylstyrene, bromo styrene, p-methylstyrene, hydroxystyrene, chloromethoxystyrene, etc.

By choosing a particular monomer to be used actually as the above monomer (A), the present invention can bring about advantages inherent to characteristics of the thus-chosen monomer (A). It may also be extremely effective to use two or more monomers (A) in combination instead of using only one monomer (A) because the advantageous effects of the individual monomers (A) may be brought about all together in some instances.

In this invention, another monomer copolymerizable with 4-isopropenylbiphenyl and the monomer (A) (hereinafter called "copolymerizable monomer") may be used as a copolymerizable comonomer in addition to them. No particular limitation is imposed on such a copolymerizable monomer so long as it is copolymerizable with 4-isopropenylbiphenyl and the monomer (A). As specific examples, the following monomers may be mentioned.

(1) Alkyl (meth)acrylates:

For example, methyl acrylate, methyl methacrylate, naphthyl acrylate, naphthyl methacrylate, trimethylolpropane triacrylate, trimethylolpropane trimethacrylate, ethylene glycol diacrylate, ethylene glycol dimethacrylate, 2,2-bis-(4-acryloxyethoxy-3,5-d1bromophenyl) propane, 2,2-bis-(4-methacryloxyethoxy-3,5-dibromophenyl)propane, 2,2-bis-(4-acryloxy-3,5 dibromophenyl)propane, 2,2-bis-(4-methacryloxy-3,5-dibromophenyl)propane, 2,2-bis-(4-methacryloxyphenyl)propane, 2,2-bis-(4-acryloxyethoxyphenyl)propane, etc.

(2) Polynuclear condensed ring vinyl compounds:

For example, vinylnaphthalene, 2-isopropenylnaphthalene, etc.

(3) Allyl compounds:

For example, triallyl isocyanurate, diallyl phthalate, etc.

By choosing a particular monomer to be used actually as the above copolymerizable monomer, the present invention can bring about advantages inherent to characteristics of the thus-chosen copolymerizable monomer. It may also by extremely effective to use two or more copolymerizable monomers in combination instead of using only one copolymerizable monomer, because the advantageous effects of the individual copolymerizable monomers may be brought about all together in some instances.

In order to obtain a copolymer having a higher refractive index by way of example, use of a halogen-containing monomer as the copolymerizable monomer is preferred. From the standpoint of ease in polymerization reaction, it is preferable to use a monomer of a relative simple structure as the copolymerizable monomer. It may hence be possible to obtain a copolymer, which features an easy polymerization reaction and a high refractive index, by using both of the above monomers in combination.

It is also preferable to use, as the copolymerizable monomer, a polyfunctional monomer containing plural ethylenically-unsaturated polymerizable bonds because the resultant copolymer has a crosslinked structure, whereby an optical material excellent in solvent resistance and mechanical strength can be obtained.

The copolymer according to this invention can be obtained by copolymerizing 4-isopropenylbiphenyl, the monomer (A) and the copolymerizable monomer in proportions of 3–40 wt. %, 30–97 wt. % and 0–67 wt. % respectively. If the proportion of 4-isopropenylbiphenyl is smaller than 3 wt. % based on the whole monomers, there is a potential problem that the copolymer to be obtained finally would fail to have a sufficiently high refractive index. If the proportion of 4-isopropenylbiphenyl is not smaller than 3 wt. %, a copolymer whose refractive index is increased by at least 0.005, depending upon the sorts of the other monomeric components, can usually be obtained without increasing its specific gravity. When the proportion of 4-isopropenylbiphenyl exceeds 40 wt. % on the other hand, the shrinkage strain upon its copolymerization with the monomer (A) becomes greater s that the polymerization product to be formed tends to be cracked. The resultant copolymer is hence unsuited for an optical material.

If the proportion of the monomer (A) is smaller than 30 wt. %, the shrinkage strain upon the polymerization becomes greater so that the polymerization product to be formed tends to be cracked even when the proportion of 4-isopropenylbiphenyl falls in the range of 3–40 wt. %. The resultant copolymer is hence unsuited for an optical material From the above reason, 4-isopropenylbiphenyl and the monomer (A) are copolymerized in proportions of 3–40 wt. % and 30–97 wt. % respectively, both, based on the whole monomers.

The copolymerization reaction of 4-isopropenylbiphenyl and the monomer (A) or of these and the copolymerizable monomer proceeds in accordance with the ordinary radical polymerization reaction mechanism or anionic polymerization reaction mechanism. A conventional polymerization initiator, for example, a radical polymerization initiator such as t-butyl peroxy-3,5,5-trimethyl hexoate or diisopropyl peroxydicarbonate can therefore be used as its polymerization initiator. A conventional polymerization process such as solution polymerization or bulk polymerization can also be used as its polymerization method.

When a monofunctional monomer is used as the copolymerizable monomer, a desired optical product can be produced by preparing a copolymer by a usual polymerization process and then molding the copolymer as an optical material by injection molding or the like. As an alternative, a required optical product can also be provided by obtaining a copolymer in a shape other than lens-shapes, such as a plate-like shape, cutting and grinding the copolymer and if necessary, subjecting the resultant piece as a preform to finishing such as surface polishing.

When a polyfunctional monomer is used as the copolymerizable monomer on the other hand, the resulting copolymer has a crosslinked structure. It is hence practically impossible to subject the resultant copolymer to processing which includes a melting or dissolving step. In this case, it is therefore generally preferable to produce an optical material or optical product directly from a monomer composition by casting polymerization.

When casting polymerization is relied upon, any one of molds and frames of various shapes designed in accordance with individual end uses, such as plate-like, lens-like, cylinder-like, prismatic, conical and spherical shapes may be used as a casting polymerization vessel. Its material is optional so long as the objects of this invention can be attained, for example, an inorganic glass, a plastic or a metal. The polymerization reaction is effected generally by pouring a mixture of a monomer composition and a polymerization initiator into a casting polymerization vessel and if necessary, heating the contents. It is also feasible to conduct the polymerization to a certain extent in a separate polymerization vessel, pouring the resultant prepolymer or syrup into a casting polymerization vessel and then bringing the polymerization reaction to completion.

In the polymerization reaction including casting polymerization, 4-isopropenylbiphenyl, the monomer (A), copolymerizable monomer and polymerization initiator to be used may be mixed together in their entirety at once or may be mixed stepwise.

The monomer composition to be subjected to a polymerization reaction can also contain an antistatic agent, a heat stabilizer, an ultraviolet absorbent, an antioxidant, and/or one or more other auxiliary additives in accordance with the intended end use of the copolymer to be formed.

The thus-obtained copolymer may be subjected to a post treatment such as heating or annealing for completing the polymerization, for enhancing the surface hardness, for eliminating strain accumulated internally upon the casting polymerization, or for other purpose.

So-called secondary lens processing can also be applied to optical products obtained from the optical material according to this invention. For example, the optical products may be coated with a silicone-based hard coating material or an organic hard coating material of the ultraviolet curable type so as to form a hard surface layer, whereby their surface hardness is enhanced. It is also possible to form an antireflection film made of a metal oxide, fluoride or the like by vacuum evaporation or sputtering.

Examples of this invention will hereinafter be described. It should however be borne in mind that the present invention is by no means limited to or by the following Examples.

EXAMPLE 1:

| | |
|---|---|
| 4-Isopropenylbiphenyl | 30 wt. parts |

| Styrene | 35 wt. parts |
| --- | --- |
| 2,2-Bis-(4-methacryloxyethoxy-3,5-dibromophenyl)propane | 30 wt. parts |

The above materials were molten and mixed into a highly-uniform, colorless and transparent melt mixture at 85° C. in a nitrogen atmosphere. The melt mixture was added with 1 part by weight of t-butyl peroxy-3,5,5-trimethyl hexoate as a polymerization initiator and was then reacted in a nitrogen atmosphere at varied temperatures for varied periods, namely, at 80° C. for 15 hours, at 100° C. for 2 hours, and then at 120° C. for 2 hours, so that the polymerization was completed to produce a copolymer.

The copolymer was practically uncolored and colorless. When laser beams of 1 mW energy obtained from a laser oscillator "GLG 5090" (trade name; manufactured by NEC CORP.) were caused to transmit through the copolymer, substantially no scattering was observed. The copolymer was hence recognized to be colorless and to have excellent transparency.

The refractive index of the copolymer was determined at 20° C. by an Abbe's refractometer ("Model 3", trade name; manufactured by Atago Inc.), and its specific gravity was also determined at 20° C. by an automatic gravimeter ("Model D-S", trade name; manufactured by Toyo Seiki Seisaku-Sho, Ltd.). The following results were obtained.

Refractive index, $n_d$: 1.618
Specific gravity, d: 1.233

COMPARATIVE EXAMPLE 1

| 4-Vinylbiphenyl | 35 wt. parts |
| --- | --- |
| Styrene | 35 wt. parts |
| 2,2-Bis-(4-methacryloxyethoxy-3,5-dibromophenyl)propane | 30 wt. parts |

The above materials were molten and mixed into a highly-uniform melt mixture at 65° C. in a nitrogen atmosphere. Using the melt mixture, a comparative copolymer was prepared by the same procedure as in Example 1.

The refractive index and specific gravity of the comparative copolymer were determined in the same manner as in Example 1 to obtain the following results.

Refractive index, $n_d$: 1.616
Specific gravity, d: 1.202

The comparative copolymer was however tinged in a yellow color as the polymerization proceeded, and was cracked. It was hence impossible to use as an optical material.

EXAMPLE 2:

| 4-Isopropenylbiphenyl | 3 wt. parts |
| --- | --- |
| Tribromophenyl methacrylate | 35 wt. parts |
| Styrene | 37 wt. parts |
| 2,2-Bis-(4-methacryloxy-3,5-dibromophenyl)propane | 25 wt. parts |

The above materials were converted under mixing at 60° C. into a highly-uniform, colorless and transparent liquid mixture. The liquid mixture was added with 1 part by weight of t-butyl peroxy-3,5,6-trimethyl hexoate as a polymerization initiator and was then reacted in a nitrogen atmosphere at varied temperatures for varied periods, namely, at 60° C. for 15 hours, at 80° C. for 2 hours, at 100° C. for 2 hours, and then at 120° C. for 2 hours, so that the polymerization was completed to produce a copolymer.

Similar to the copolymer obtained in Example 1, the resultant copolymer was recognized to be practically colorless and to have excellent transparency.

The refractive index and specific gravity of the copolymer were determined in the same manner as in Example 1 to obtain the following results.

Refractive index, $n_d$: 1.617
Specific gravity, d: 1.394

COMPARATIVE EXAMPLE 2:

| Tribromophenyl methacrylate | 38 wt. parts |
| --- | --- |
| Styrene | 37 wt. parts |
| 2,2-Bis-(4-methacryloxy-3,5-dibromophenyl)propane | 25 wt. parts |

Using the above materials, a comparative copolymer was prepared by the same procedure as in Example 2.

The refractive index and specific gravity of the comparative copolymer were determined in the same manner as in Example 1 to obtain the following results.

Refractive index, $n_d$: 1.616
Specific gravity, d: 1.503;

Although the refractive index was similar compared to that of the copolymer obtained in Example 2, the specific gravity was large.

COMPARATIVE EXAMPLE 3:

| Tribromophenyl methacrylate | 35 wt. parts |
| --- | --- |
| Styrene | 40 wt. parts |
| 2,2-Bis-(4-methacryloxy-3,5-dibromophenyl)propane | 25 wt. parts |

Using the above materials, a comparative copolymer was prepared by the same procedure as in Example 2.

The refractive index and specific gravity of the comparative copolymer were determined in the same manner as in Example 1 to obtain the following results.

Refractive index, $n_d$: 1.611
Specific gravity, d: 1.440

The refractive index was small compared to that of the copolymer obtained in Example 2.

It is hence apparent from the results of the above Comparative Example 2 and Comparative Example 3 that a copolymer having a high refractive index can be obtained without increasing its specific gravity by causing 4-isopropenylbiphenyl and the monomer (A) to contain in combination.

EXAMPLE 3:

| 4-Isopropenylbiphenyl | 20 wt. parts |
| --- | --- |
| p-Methylstyrene | 80 wt. parts |

The above materials were molten and mixed into a highly-uniform melt mixture at 70° C. in a nitrogen atmosphere. Using the melt mixture, a copolymer was prepared by the same procedure as in Example 1.

Similar to the copolymer obtained in Example 1, the copolymer thus obtained was recognized to be practically colorless and to have excellent transparency.

The refractive index and specific gravity of the copolymer were determined in the same manner as in Example 1 to obtain the following results.

Refractive index, $n_d$: 1.604
Specific gravity, d: 1.072

EXAMPLE 4:

| 4-Isopropenylbiphenyl | 30 wt. parts |
|---|---|
| Acryloxyethoxybenzene | 70 wt. parts |

The above materials were molten and mixed into a highly-uniform melt mixture at 80° C. in a nitrogen atmosphere. Using the melt mixture, a copolymer was prepared by the same procedure as in Example 1.

Similar to the copolymer obtained in Example 1, the copolymer thus obtained was recognized to be practically colorless and to have excellent transparency.

The refractive index and specific gravity of the copolymer were determined in the same manner as in Example 1 to obtain the following results.

Refractive index, $n_d$: 1.603
Specific gravity, d: 1.120

EXAMPLE 5:

| 4-Isopropenylbiphenyl | 20 wt. parts |
|---|---|
| Allyl phenyl ether | 80 wt. parts |

The above materials were converted under mixing at 60° C. into a highly-uniform, colorless and transparent liquid mixture. The liquid mixture was added with 1 part by weight of diisopropyl peroxydicarbonate and 1 part by weight of t-butyl peroxy-3,5,5-trimethyl hexoate as polymerization initiators and was then reacted in a nitrogen atmosphere at varied temperatures for varied periods, namely, at 60° C. for 15 hours, at 80° C. for 2 hours, at 100° C. for 2 hours, and then at 120° C. for 2 hours, so that the polymerization was completed to produce a copolymer.

Similar to the copolymer obtained in Example 1, the resultant copolymer was recognized to be practically colorless and to have excellent transparency.

The refractive index and specific gravity of the copolymer were determined in the same manner as in Example 1 to obtain the following results.

Refractive index, $n_d$: 1.603
Specific gravity, d: 1.113

EXAMPLE 6:

| 4-Isopropenylbiphenyl | 20 wt. parts |
|---|---|
| Allyl benzoate | 80 wt. parts |

The above materials were molten and mixed into a highly-uniform melt mixture at 60° C. in a nitrogen atmosphere. Using the melt mixture, a copolymer was prepared by the same procedure as in Example 5.

Similar to the copolymer obtained in Example 1, the copolymer thus obtained was recognized to be practically colorless and to have excellent transparency.

The refractive index and specific gravity of the copolymer were determined in the same manner as in Example 1 to obtain the following results.

Refractive index, $n_d$ 1.601
Specific gravity, d: 1.164

We claim:

1. An optical material comprising a copolymer obtained by copolymerizing 3–40 wt. % of 4-iospropenyl-biphenyl, 30–97 wt. % of a monofunctional aromatic monomer represented by the following formula (I), and 0–67 wt. % of at least one monomer copolymerizable with 4-isopropenylbiphenyl and the monofunctional aromatic monomer and selected from the group consisting of alkyl acrylates, polynuclear condensed ring vinyl compounds, and allyl compounds, wherein Formula (I) is:

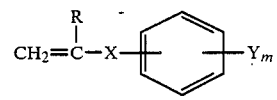

wherein R means a hydrogen atom or methyl group, X denotes

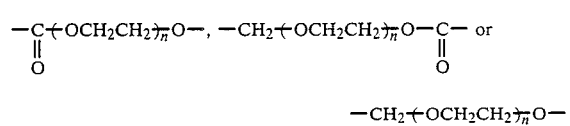

$$-CH_2+OCH_2CH_2)_{\overline{n}}O-$$

in which n stands for an integer of 0–3, Y is a halogen atom other than a fluorine atom, or a methyl, hydroxyl or methoxy group, and m stands for an integer of 0–3, with the proviso that Y may be different from each other when n is 2 or 3.

2. The optical material as claimed in claim 1, wherein the monomer copolymerizable with 4-isopropenyl-biphenyl and the monofunctional aromatic monomer is selected from the group consisting of alkyl acrylates, polynuclear condensed ring vinyl compounds, allyl esters and allyl ethers.

3. The optical material as claimed in claim 1, wherein the monomer copolymerizable with 4-isopropenyl-biphenyl and the monofunctional aromatic monomer is an aromatic monomer containing one or more halogen atoms.

4. The optical material as claimed in claim 1, wherein the monomer copolymerizable with 4-isopropenyl-biphenyl and the monofunctional aromatic monomer is a polyfunctional monomer containing plural ethylenically-unsaturated polymerizable bonds.

* * * * *